(12) United States Patent
Gustke

(10) Patent No.: US 7,075,915 B1
(45) Date of Patent: Jul. 11, 2006

(54) COMMUNICATION SYSTEM INCLUDING AT LEAST ONE RADIO BASE STATION TO WHICH RADIO NETWORK TERMINATING FACILITIES FOR CONNECTING COMMUNICATION TERMINALS CAN BE CONNECTED

(75) Inventor: Andreas Gustke, Wittgensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/762,011

(22) PCT Filed: Jul. 1, 1999

(86) PCT No.: PCT/DE99/02002

§ 371 (c)(1),
(2), (4) Date: May 15, 2001

(87) PCT Pub. No.: WO00/08874

PCT Pub. Date: Feb. 17, 2000

(30) Foreign Application Priority Data

Jul. 31, 1998 (DE) ................................. 198 34 634

(51) Int. Cl.
*H04Q 7/28* (2006.01)
(52) U.S. Cl. ................... 370/341; 370/338; 455/422.1
(58) Field of Classification Search ............... 370/310, 370/328, 319–321, 329, 330, 335–337, 340, 370/345, 349, 352, 315, 338, 341, 342, 343, 370/344, 351, 353, 354, 324, 346, 347; 375/133, 375/350; 455/421–426, 450, 428, 445, 462; 379/49; 709/239

See application file for complete search history.

(56) References Cited

U.S. PATENT DOCUMENTS

| 5,481,604 | A | | 1/1996 | Minot |
| 6,009,085 | A | * | 12/1999 | Lechner ...................... 370/324 |
| 6,028,853 | A | * | 2/2000 | Haartsen ...................... 370/338 |
| 6,034,951 | A | * | 3/2000 | Du .............................. 370/328 |
| 6,075,792 | A | * | 6/2000 | Ozluturk ...................... 370/441 |
| 6,141,533 | A | * | 10/2000 | Wilson et al. ............. 455/11.1 |
| 6,178,331 | B1 | * | 1/2001 | Holmes et al. ............. 455/466 |
| 6,185,409 | B1 | * | 2/2001 | Threadgill et al. ......... 455/12.1 |
| 6,188,893 | B1 | * | 2/2001 | Lechner et al. ........... 455/422.1 |
| 6,188,895 | B1 | * | 2/2001 | Schmitz et al. .......... 455/426.2 |
| 6,289,389 | B1 | * | 9/2001 | Kikinis ....................... 709/239 |
| 6,359,892 | B1 | * | 3/2002 | Szlam ........................ 370/401 |
| 6,385,195 | B1 | * | 5/2002 | Sicher et al. ............... 370/356 |

(Continued)

FOREIGN PATENT DOCUMENTS

DE    196 40 447    9/1996

(Continued)

OTHER PUBLICATIONS

Telcom Report 18 (1995) Drahtlos zum Freizeichen, pp. 34-37.
Drahtloses Festnetz nach dem Internet Modell, pp. 109-111.
The Ricochet Wireless Network Overview, pp. 1-4.

*Primary Examiner*—Phirin Sam
(74) *Attorney, Agent, or Firm*—Bell, Boyd & Lloyd LLC

(57) ABSTRACT

In a communication system including at least one radio base station to which radio network terminating facilities can be connected, additional wireless communication relations via which information can be switched directly between the network terminating facilities are provided between the network terminating facilities in addition to communication relations between the radio base station and the network terminating facilities.

16 Claims, 1 Drawing Sheet

U.S. PATENT DOCUMENTS

| | | | |
|---|---|---|---|
| 6,397,069 B1 * | 5/2002 | Biedermann et al. | 455/450 |
| 6,484,027 B1 * | 11/2002 | Mauney et al. | 455/421 |
| 6,493,550 B1 * | 12/2002 | Raith | 455/422.1 |
| 6,522,641 B1 * | 2/2003 | Siu et al. | 370/338 |
| 6,574,266 B1 * | 6/2003 | Haartsen | 375/133 |
| 6,600,734 B1 * | 7/2003 | Gernert et al. | 370/352 |
| 6,661,784 B1 * | 12/2003 | Nykanen | 370/338 |
| 6,728,341 B1 * | 4/2004 | Puchek et al. | 379/49 |

FOREIGN PATENT DOCUMENTS

| | | |
|---|---|---|
| DE | 197 04 907 A1 | 7/1997 |
| EP | 0 589 552 | 3/1994 |
| EP | 0 689 303 A1 | 12/1995 |
| WO | WO 98/17032 | 4/1998 |

* cited by examiner

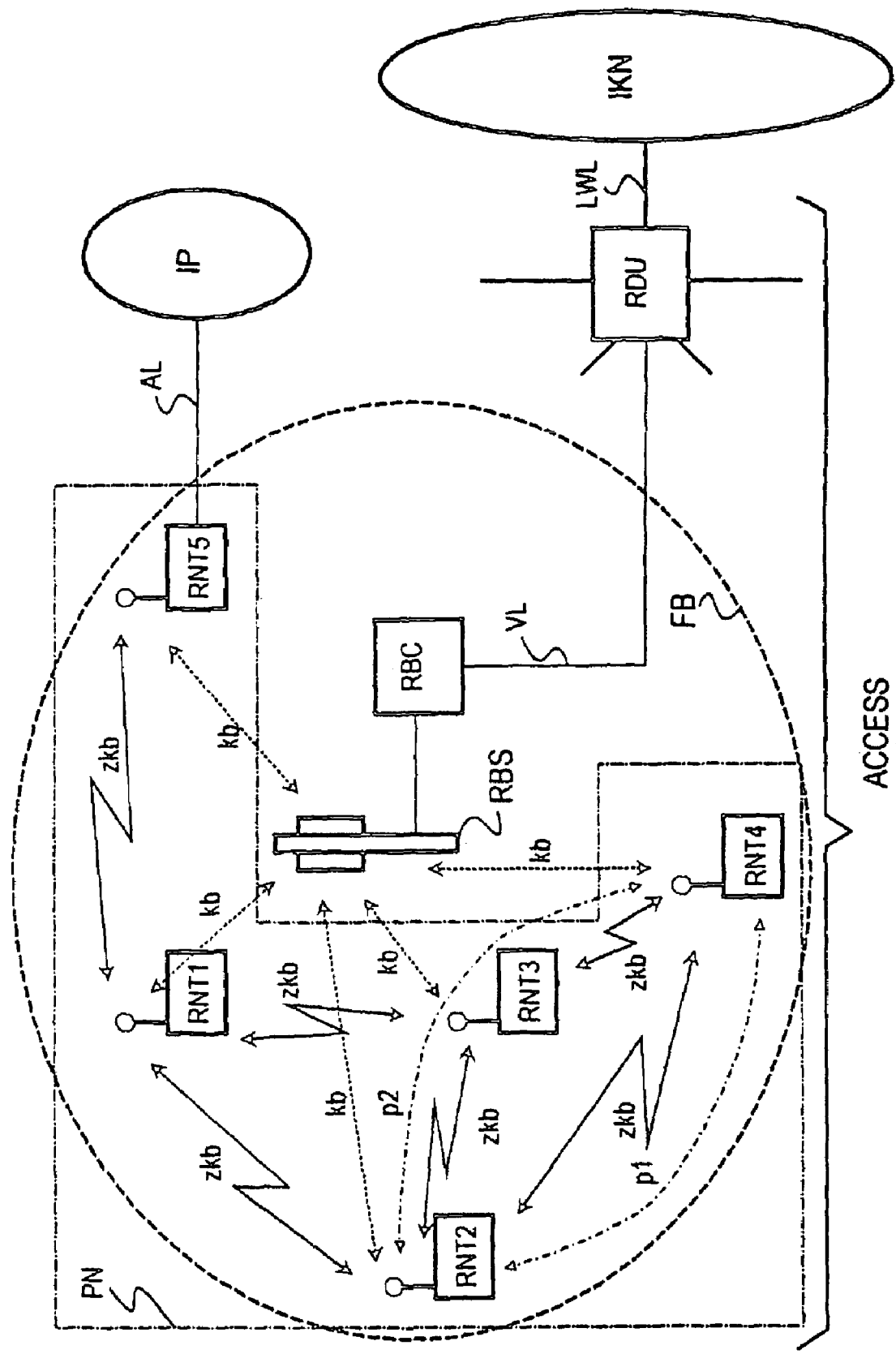

COMMUNICATION SYSTEM INCLUDING AT LEAST ONE RADIO BASE STATION TO WHICH RADIO NETWORK TERMINATING FACILITIES FOR CONNECTING COMMUNICATION TERMINALS CAN BE CONNECTED

BACKGROUND OF THE INVENTION

1. Field of the Invention

The present invention relates to a communication system which includes at least one radio base station to which radio network terminating facilities can be connected, wherein additional wireless communication relations via which information can be switched directly between the network terminating facilities are provided between the network terminating facilities.

2. Description of the Prior Art

In wireless communication networks based on radio channels, especially in point-to-multipoint radio feeder networks (also called "radio in the local loop" or "RLL") a number of network terminating units are, in each case connected to a base station (also called "radio base station" or "RBS") via one or more radio channels. In telecom Report No. 18 (1995), Vol. 1 "Drahtlos zum Freizeichen", (wirelessly to the ringing-tone signal), page 36, 37, for example, a wireless feeder network, also called subscriber access network, for wireless voice and data communication is described. The communication system described represents an RLL subscriber line in combination with modern broadband infrastructure, e.g. "fiber to the curb", which can be implemented within a short period of time and without great expenditure, instead of running wire-connected subscriber lines. The network terminating units RNT allocated to the individual subscribers are connected to a high-level communication network, for example to the ISDN-oriented fixed network, via the "radio channel" transmission medium and the base station RBS.

In EP 0 689 303 A, a wireless TDMA-oriented communication system is described in which a number of wireless communication terminals or mobile telephones are connected to a radio base station. The wireless communication system represents a wireless TDMA-oriented communication network in which first information items can be exchanged between the wireless communication terminals and the radio base station in accordance with a time-slot-oriented or TDMA-oriented transmission protocol. In this arrangement, this information is transmitted via a first transmission frequency. In addition, other information items modulated on a second carrier wave with a second carrier frequency can be transmitted directly between two wireless communication terminals. The additional information is then transmitted in accordance with the same TDMA protocol in accordance with which the first information items are also transmitted.

Furthermore, a communication system having at least one radio base station with mobile radio telephones connected thereto is described in which first communication relations between the radio base station and the mobile radio telephones are provided. The mobile radio telephones are designed in such a manner that direct communication with a further mobile radio telephone of the same type of construction is, in each case, possible without involving the mobile radio network. Direct communication between the mobile radio telephones takes place either via additional frequencies or via special coding methods, the direct communication between two mobile radio telephones only being possible if these are arranged spatially close enough to one another. The additional communication relations which is thus made possible between two mobile radio telephones can only be set up as direct connections between two mobile radio telephones "in the manner of a walkie-talkie".

The present invention is directed to expanding current wireless communication networks based on a hierarchical structure, especially wireless subscriber access networks, by additional features and possible applications which are of interest both to the user and to the communication network operator.

SUMMARY OF THE INVENTION

Accordingly, in the communication system according to the present invention, radio network terminating facilities for connecting communication terminals can be connected to at least one radio base station, wherein first communication relations are provided between the radio base station and the radio network terminating facilities within a first communication network. A key aspect of the communication system of the present invention is that the radio network terminating facilities have additional transmission and switching means for implementing at least one further communication network; such additional capabilities being provided for implementing additional wireless communication relations between the radio network terminating facilities.

An advantage of the communication system of the present invention is that information voice (video or other data), can be switched directly between network terminating units arranged in a subscriber access network. Shifting switching functions which were previously arranged centrally (i.e., in the base stations or in their controllers), as network intelligence components into the network terminating units which are wirelessly connected to the base station enables the communication network operators to migrate step by step towards combined wireless communication networks with a decentralized organization. Creating the possibility of converting hierarchically structured communication networks step by step and in a demand-related manner into communication networks with a decentralized organization and, in particular, adapting wireless subscriber access networks to the future subscriber requirements (chronologically unlimited utilization of broadband services and billing of any costs on the basis of a transparent tariff model, such as a monthly flat rate) enhances the acceptance, particularly of wireless subscriber access networks, and accelerates their market penetration.

According to an embodiment of the present invention, the additional capabilities are effected such that the additional wireless communication relations between at least two radio network terminating facilities are switched via at least one further radio network terminating facility. Advantageously equipping the radio network terminating facilities with repeater functions makes it possible to implement an additional, closely intermeshed wireless communication network within the subscriber access network without great time expenditure and with minimum technical complexity. The additional communication network can be operated independently of the communication relations between the radio network terminating facilities and the radio base station. Advantageously, the infrastructure of wireless subscriber access networks already installed can be used for implementing the additional wireless communication network; e.g. by exchanging radio network terminating facilities already installed in a wireless subscriber access network.

According to a further development of the present invention, the at least one further communication network is provided for implementing additional wireless communication relations in a home domain. According to yet another development, the first communication network is constructed as a public communication network and the at least one further communication network is constructed as a private communication network. Due to these advantageous developments, wireless communication networks currently to be installed, especially public wireless subscriber access networks for transmitting POTS (plain old telephone service) services, can be adapted to the customer requirements without great expenditure by setting up an additional communication network or private communication network in the home domain which can be operated in parallel, for example, setting up inexpensive modem access points for the wireless connection of personal computers to higher-level computer networks.

The additional capabilities are advantageously constructed in such a manner that, with the aid of the wireless communication relations between the radio network terminating facilities, a self-configuring wireless communication network having a neural network structure is formed. This advantageous embodiment makes it possible to shift the switching functions, which were previously implemented in the radio base stations, as part of the network intelligence into the peripherals of the radio network terminating facilities as a result of which the economic expenditure for implementing additional wireless communication networks is minimized. Advantageously, wireless communication networks without radio base stations and the central switching functions arranged therein also can be implemented with little economic expenditure.

According to another advantageous embodiment of the present invention, the additional capabilities are effected such that information to be transmitted is inserted into packet-oriented data streams and the packet-oriented data streams are switched via the wireless communication network. Services based on the Internet protocol—also called IP services—are implemented with the aid of the wireless communication network. As a result, the subscribers connected to the radio network terminating facilities can be provided inexpensively with current IP services based on the Internet technology; for, example transmission and reception of E-mail, transmission of files or utilization of the world wide web.

Pursuant to a further embodiment of the present invention, at least one radio network terminating facilities exhibits at least one further connection to a second communication network. This further connection can be constructed, for example, as access point to a higher-level communication network, such as to an IP-based communication network of a further network operator.

According to another embodiment of the present invention, the radio network terminating facilities exhibit further capabilities to implement a wireless packet-oriented communication system according to ITU Recommendation H.323 or H.324. IT Recommendation H.323 specifies communication systems via which audio, video and other data are transmitted via packet-based or packet-oriented communication networks. Packet-oriented networks can represent both local area networks (LANs) and wide area networks (WANs) and Intranets or the Internet. Advantageously, a communication system according to Recommendation H.323 or, respectively, H.324 can be implemented independently of the basic physical network topology; i.e. incompatibilities between products of different manufacturers in the case of multimedia communication via packet-oriented communication networks are illuminated. Advantageously, IP-based communication networks can be connected to normal telephone networks for implementing pure voice connections with the aid of the Voice over Internet Protocol (VoIP) standard.

Additional features and advantages of the present invention are described in, and will be apparent from, the following Detailed Description of the Preferred Embodiments and the Drawings.

DESCRIPTION OF THE DRAWINGS

FIG. 1 shows a communication system of the present invention wherein a number of radio network terminating facilities are connected to a radio base station.

DETAILED DESCRIPTION OF THE PREFERRED EMBODIMENTS

The block diagram FIG. 1 shows a communication system which is arranged in a coverage area and in which a number of radio network terminating facilities RNT1 . . . 5 are connected via the wireless "radio channel" transmission medium or, respectively, via wireless communication relations KB to a radio base station RBS representing the center of the coverage area or, respectively, the radio area FB. In this exemplary embodiment, the communication system represents a public wireless subscriber access network or ACCESS (also called ACCESS network) for example based on a CDMA multiple access method (also called wireless local loop "WLL" system). At the subscriber end, each network terminating facility RNT1 . . . 5 can be connected to at least one decentralized communication terminal which is not shown. A decentralized communication terminal can be implemented, for example, by a multimedia communication terminal, an ISDN-oriented telephone terminal or by a personal computer. The radio base station RBS is connected to a radio base station controller RBC via a connecting line. The radio base station controller RBC is connected via a copper line or an optical waveguide or a microwave feeder system, which is indicated by VL in the block diagram, to a radio distribution unit RDU in which the voice transcoding and the administration of the resources of the radio area FB and of the resources in the direction of the higher-level ISDN-oriented communication network IKN takes place, among other things. As an alternative, the radio resources of the respective radio area FB also can be administered or, respectively, offered and allocated in the radio base station RBS or in the radio base station controller RBC. The radio distribution unit RDU is connected to the public fixed network via a standardized V5.1 interface; for example, by an optical waveguide LWL. That is all decentralized communication terminals connected to the radio network terminating facilities RNT1 . . . 5 are connected to the higher-level, ISDN-oriented communication network IKN via the wireless subscriber access network or ACCESS.

According to the present invention, each decentralized radio network terminating facilities RNT1 . . . 5 exhibits, in addition to the radio interface which, for example, also be constructed in accordance with the DECT standard, for implementing the "WLL system" already described or, respectively, for implementing the public subscriber access network or ACCESS, additional radio functions (not shown) for implementing a further radio interface. Via the further radio interface, additional wireless communication relations zkb are set up between the decentralized radio network terminating facilities RNT1 .... 5 arranged in the subscriber access network or ACCESS, with the aid of which the radio network terminating facilities RNT1 .... 5 are connected to one another in a closely intermeshed manner. Due to the additional wireless communication relations, an additional wireless communication network PN, for example a private communication network PN arranged in a city district which is illustrated by a dotted border, is implemented in parallel with the public wireless subscriber access network or ACCESS which already exists. In the text which follows, the additional wireless communication network PN implemented with the aid of the additional wireless communication relations zkb is also called a private communication network PN.

The further radio interface is based, for example, on the combination of a multicarrier modulation or, respectively, MC modulation and a spread-spectrum technology in transmission; the combination is also called multicarrier spread-spectrum MC-SS. Combining these transmission techniques also results in a combination of the advantages of the transmission techniques: higher flexibility, higher spectrum efficiency, simpler detection possibilities and avoidance of narrow-band interference. As variants of embodiments of the MC-SS multiple access methods, MC-CDMA (which results from a combination of DS-CDMA with MC modulation) or MC-DS-CDMA or MT-CDMA (multitone CDMA) can be mentioned. As an alternative, the further radio interface can be constructed, for example, in accordance with the DECT standard. The close intermeshing of the individual radio network terminating facilities RNT1 ... 5 arranged in the subscriber access network or ACCESS, which is effected via the additional communication relations zkb, provides for direct communication of each radio network terminating facility RNT1 ... 5 with the radio network terminating facilities RNT1 ... 5 which are, in each case, locally adjacent so that control and addressing data can be arbitrarily exchanged between adjacent radio network terminating facilities RNT1 ... 5. Since this provides for autoconfiguration during the initialization of a network terminating facility RNT1 ... 5 and for automatic routing during the setting-up of a connection via the radio network terminating facilities RNT1 .... 5 which are arranged in the subscriber access network or ACCESS and have mutually equal access authorization, the private communication network PN implemented with the aid of the additional wireless communication relations zbk attains the characteristic of a self-learning neural network. Thus, instead of manual, cellular communication network planning (e.g., by manually configuring the connection and routing tables stored in the individual radio network terminating facilities RNT1 ... 5) the private communication network PN is self-configured. In self-configuration, the frequency range and the transmitting level are tuned to the neighboring radio network terminating facilities RNT1 ... 5 found by each radio network terminating facility RNT1 ... 5 newly added to the wireless subscriber access network or ACCESS during the initialization. Furthermore, adaptive antennas and their controllable directional pattern provide for dynamic power matching.

Depending on the state of configuration of the connection and routing tables stored in the individual radio network terminating facilities RNT1 ... 5 and depending on the traffic load (i.e., depending on the loading on the individual additional wireless communication relations zkb), data to be transmitted, for example from the second radio network terminating facility RNT2 to the fourth radio network terminating facility RNT4, are transmitted either via the radio channel set up directly between the second and fourth radio network terminating facility RNT2, 4 (illustrated by a first dot-dashed arrow p1) or alternatively via the third radio network terminating facility RNT3 acting as relay station or repeater station (illustrated by a second dot-dashed arrow p2). Each radio network terminating facility RNT1 ... 5 arranged within the private communication network PN can represent an originating and/or terminating point of a connection operated via the private communication network PN and, at the same time, fulfill the function of a repeater or relay station for other connections operated via the private communication network PN. The private communication network PN can be constructed both as a packet-oriented communication network PN or as a circuit-oriented communication network PN. In a packet-oriented private communication network PN, each radio network terminating facility RNT1 ... 5 arranged therein represents a network node via which data packets, with the routing information arranged therein and user information to be transmitted, are readdressed and forwarded with the aid of the stored routing tables. In a circuit-oriented private communication network PN, each current connection is based on a circuit-switched radio channel via an arbitrary number of radio network terminating units RNT1 ... 5.

In the present exemplary embodiment, the fourth radio network terminating facility RNT4 is connected via a subscriber line AL to a packet-oriented communication network IP conforming to the Internet Protocol; for example, a communication network connecting a number of private communication networks PN, also called "backbone". Advantageously, transitions between communication networks having different transmission or access protocols can be implemented by interposing special conversion units, also called gateways. As examples, transitions to X.25 communication networks or frame-relay communication networks or virtual telephone networks can be mentioned.

According to an advantageous variant of the embodiment of the communication system shown, the private communication network PN implemented with the aid of the additional wireless communication relations zkb is constructed as communication system according to ITU Recommendation H.323—packet-based multimedia communication systems—or, respectively, H.324—low bitrate multimedia communication, in which at least audio communication is supported by each local communication terminal; for example, a personal computer (not shown) connected to a radio network terminating facility RNT1 ... 5. In contrast, processing and transportation of video and other data is optional. Communication terminals constructed in accordance with ITU Recommendation, H.323 or, respectively, H.324 can be, for example, functionally integrated in the personal computer or implemented as stand-alone solution. An H.323 communication system exhibits a number of logical units which are called "terminal", "gateway", "gatekeeper" and "multipoint control unit (MCU)". In the present exemplary embodiment, each radio network terminating unit RNT1 ... 5 arranged in the subscriber access network or ACCESS represents a logical unit according to Recommendation H.323. A radio network terminating facility RNT1 ... 5 implementing the function of an H.323 terminal can communicate, for example, with another H.323 terminal, gateway or multipoint control unit (MCU) in real time and it is mainly voice data which is transmitted in real time with the transmission of video and other data being supported additionally. A radio network terminating facility RNT1 ... 5 implementing the function of an H.323 gateway can communicate, for example, with other H.323 gateways or with H.323 terminals in circuit-oriented communication networks IP. Circuit-oriented communication networks can be, for example, the ISDN network, the ATM network or the conventional analog telephone network. A number of private communication networks PN implemented in wireless subscriber access networks or ACCESS, for example, can be connected via such a connection-oriented communication network IP. A radio network terminating facility RNT1 . . . 5 implementing the function of multipoint control unit (MCU) enables three or more H.323 terminals or H.323 gateways to participate in multipoint connections or in conferences, respectively.

In a private communication network PN constructed in accordance with ITU Recommendation H.323, multimedia connections from the radio network terminating facilities RNT1 . . . 5 arranged in the private communication network PN or, respectively, from the communication terminals connected thereto to the communication radio network IP connected to the fifth network terminating facility RNT5 or, respectively, corresponding multimedia connections to further private communication networks connected thereto can be implemented between networks. In this arrangement, a protocol conversion between the transmission protocols used in each case in the communication networks PN, IP is carried out by correspondingly designed gateways. Pure voice connections can be advantageously switched between the individual closely intermeshed radio network terminating facilities RNT1 . . . 5 arranged in the subscriber access network or ACCESS or, respectively, in the private communication network PN. The voice data transmitted via the private communication network PN can be retransmitted with the aid of the Voice over Internet Protocol (VoIP) standard via a communication network IP constructed in accordance with the Internet Protocol standard.

Switching voice data and all other types of multimedia data within the private communication network PN described and the possibility of retransmitting the multimedia data via the higher-level communication network IP represents an alternative possibility of switching data compared with conventional transmission paths implemented in the current wireless subscriber access networks or ACCESS, such as, for example, via the radio base station RBS and via the ISDN-oriented fixed network IKN connected to the radio base station RBS. The subscriber access network or ACCESS and the private communication network PN implemented therein in each case represent independent communication networks which can be operated by in each case different communication network operators or providers. The parallel arrangement of a number of independent wireless communication networks or ACCESS, PN within the same radio area FB makes it possible to implement subscriber access networks or ACCESS which can be designed to be flexible and which can be adapted to the new requirements of the subscribers connected to them within a short period of time and with the least economic expenditure.

Although the present invention has been described with reference to specific embodiments, those of skill in the art will recognize that changes may be made thereto without departing from the spirit and scope of the invention as set forth in the hereafter appended claims.

The invention claimed is:

1. A communication system, comprising:
at least one radio base station to which radio network terminating units for connecting communication terminals can be connected;
first communication relations provided between the radio base station and the radio network terminating units within a first communication network operating under a first communications standard via a first interface; and
additional transmission and switching means in the radio network terminating units for implementing at least one further communication network operating under a standard that is different from the first communications standard via a second interface, wherein the additional transmission and switching means provide for implementing additional wireless communication relations between the radio network terminating units.

2. A communication system as claimed in claim 1, further comprising:
at least one further radio network terminating facility, wherein the additional wireless communication relations are switched via the at least one further radio network terminating facility.

3. A communication system as claimed in claim 1, wherein the at least one further communication network is provided for implementing additional wireless communication relations in a home domain.

4. A communication system as claimed in claim 1, wherein the first communication network is a public communication network and the at least one further communication network is a private communication network.

5. A communication system as claimed in claim 1, wherein the additional transmission and switching means includes switching and transmission routines, implemented as programs, for implementing the additional wireless communication relations.

6. A communication system as claimed in claim 1, wherein at least one of a connection-oriented wireless communication network and a connectionless wireless communication network is formed with the aid of the additional wireless communication relations.

7. A communication system as claimed in claim 1, wherein a self-configuring wireless communication network having a neural network structure is formed with the aid of the additional wireless communication relations.

8. A communication system as claimed in claim 6, wherein information to be transmitted is inserted into packet-oriented data streams and the packet-oriented data streams are switched via the wireless communication network, and wherein services based on Internet protocol are implemented with the aid of the wireless communication network.

9. A communication system as claimed in claim 7, wherein information to be transmitted is inserted into packet-oriented data streams and the packet-oriented data streams are switched via the wireless communication network, and wherein services based on Internet protocol are implemented with the aid of the wireless communication network.

10. A communication system as claimed in claim 1, further comprising:
means for implementing the communication relations in the radio base station and in the radio network terminating units, wherein data streams to be transmitted from the radio base station to the radio network terminating units are transmitted in accordance with at least one of a TDM-oriented, FDM-oriented and CDM-oriented multiple transmission method, and wherein data streams to be transmitted from the radio network terminating units to the radio base station are transmitted according to at least one of a TDMA, CDMA and FDMA access transmission method.

11. A communication system as claimed in claim 1, wherein the additional wireless communication relations are implemented with the aid of one of a multi carrier CDMA multiple access method, a circuit oriented FDM modulation, and a multiple access method conforming to CDMA.

12. A communication system as claimed in claim 1, wherein at least one of the radio network terminating units includes at least one further connection to an additional communication network.

13. A communication system as claimed in claim 1, wherein at least one of the radio network terminating units additionally represents a repeater network terminating unit.

14. A communication system as claimed in claim 1, wherein at least one of the radio network terminating units includes further means for encrypting information to be transmitted with the aid of the additional wireless communication relations.

15. A communication system as claimed in claim 1, wherein at least one of the radio network terminating units includes further means for compressing information to be transmitted with the aid of the additional wireless communication relations.

16. A communication system as claimed in claim 1, wherein at least one the radio network terminating units includes means for implementing a wireless packet-oriented communication system according to ITU Recommendation H.323 or H.324.

* * * * *